US012327282B2

(12) United States Patent
Blum et al.

(10) Patent No.: US 12,327,282 B2
(45) Date of Patent: *Jun. 10, 2025

(54) USER INTERFACE FOR IDENTIFYING AND CORRECTING RESULTS OF DATA PROCESSING RULES PREVENTING TRANSMISSION OF DATA

(71) Applicant: WELLS FARGO BANK, N.A., San Francisco, CA (US)

(72) Inventors: Ronald T. Blum, Des Moines, IA (US); Thanigaivasan Chinnasamy, Charlotte, NC (US); Prashanth Sravan Kumar Erpula, Hyderabad (IN); Sathyanarayana Pambi, Hyderabad (IN); Ashish Chauhan, Hyderabad (IN); Cory Patrick, Chandler, AZ (US); Hariprasath Pannir Selvam, Hyderabad (IN); Rizwan A. Shiek, Bangalore (IN); Troy Wise, Marriottsville, MD (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,726

(22) Filed: Sep. 27, 2023

(65) Prior Publication Data

US 2024/0412286 A1     Dec. 12, 2024

Related U.S. Application Data

(63) Continuation-in-part of application No. 18/330,485, filed on Jun. 7, 2023.

(51) Int. Cl.
*G06F 16/00*     (2019.01)
*G06F 16/10*     (2019.01)
(Continued)

(52) U.S. Cl.
CPC ............. *G06Q 40/03* (2023.01); *G06F 16/10* (2019.01); *G06F 16/13* (2019.01); *G06F 16/182* (2019.01);
(Continued)

(58) Field of Classification Search
CPC ......... G06F 16/10–11; G06F 16/13–14; G06F 16/182; G06F 16/185; G06F 16/2343;
(Continued)

(56) References Cited

U.S. PATENT DOCUMENTS 4,417,136 A     11/1983  Rushby et al.
6,012,051 A *    1/2000  Sammon, Jr. .......... G06Q 30/02
                                                              705/26.2

(Continued)

FOREIGN PATENT DOCUMENTS

CN     103489051 A    1/2014
CN     111638948 A    9/2020

(Continued)

OTHER PUBLICATIONS

Xiaofei Luo et al., "Learning-Based Off-Chain Transaction Scheduling in Prioritized Payment Channel Networks", IEEE Journal on Selected Areas in Communications ( vol. 40, Issue: 12, Dec. 2022)pp. 3589-3599.*

(Continued)

*Primary Examiner* — Srirama Channavajjala
(74) *Attorney, Agent, or Firm* — Kilpatrick Townsend & Stockton LLP

(57) ABSTRACT

Systems and methods for a user interface for preventing data transmission including: applying data processing rules to a set of transaction data to determine a furnishing decision for a subset of the set of transaction data, receiving a selection of one or more data processing rules of the set of data processing rules; determining, based on the selected data (Continued)

processing rules, a list of accounts comprising at least a first account and a second account, wherein the first account is associated with the first data of the subset and the furnishing decision for the first data, and the second account is associated with the second data of the subset and the furnishing decision for the second data; changing the furnishing decision for the first data; and automatically updating the furnishing decision for data associated with each account of the list of accounts.

17 Claims, 6 Drawing Sheets

(51) Int. Cl.

| | | |
|---|---|---|
| G06F 16/13 | (2019.01) | |
| G06F 16/182 | (2019.01) | |
| G06F 16/185 | (2019.01) | |
| G06F 16/21 | (2019.01) | |
| G06F 16/23 | (2019.01) | |
| G06F 16/2455 | (2019.01) | |
| G06Q 10/087 | (2023.01) | |
| G06Q 20/10 | (2012.01) | |
| G06Q 20/40 | (2012.01) | |
| G06Q 40/03 | (2023.01) | |
| G06Q 40/12 | (2023.01) | |

(52) U.S. Cl.
CPC .......... *G06F 16/185* (2019.01); *G06F 16/219* (2019.01); *G06F 16/2343* (2019.01); *G06F 16/2455* (2019.01); *G06Q 10/087* (2013.01); *G06Q 20/10* (2013.01); *G06Q 20/4016* (2013.01); *G06Q 40/12* (2013.12)

(58) Field of Classification Search
CPC .... G06F 16/2455–2456; G06F 16/219; G06Q 20/4016; G06Q 20/10; G06Q 40/00; G06Q 40/02; G06Q 40/12; G06Q 10/087
USPC ........................................................ 707/894
See application file for complete search history.

(56) References Cited

U.S. PATENT DOCUMENTS

| | | | | |
|---|---|---|---|---|
| 6,175,889 | B1* | 1/2001 | Olarig ................. | G06F 13/4027 370/402 |
| 7,401,266 | B1 | 7/2008 | Laman, III | |
| 7,558,834 | B2* | 7/2009 | Embree ............... | H04L 41/0631 709/224 |
| 8,406,732 | B2* | 3/2013 | Cai ........................ | H04M 15/00 455/406 |
| 11,341,118 | B2* | 5/2022 | Collins ................. | G06F 16/211 |
| 11,886,399 | B2* | 1/2024 | Joyce .................. | G06F 16/2228 |
| 2002/0010684 | A1* | 1/2002 | Moskowitz ............ | G06Q 20/40 713/176 |
| 2008/0301022 | A1* | 12/2008 | Patel ...................... | G06Q 40/02 705/35 |
| 2009/0043684 | A1* | 2/2009 | Solberg ................. | G06Q 40/00 707/E17.014 |
| 2012/0208495 | A1* | 8/2012 | Lawson .............. | H04L 12/1446 455/406 |
| 2012/0233074 | A1* | 9/2012 | Dangott ................. | G06Q 40/06 705/44 |
| 2013/0179314 | A1* | 7/2013 | Stoke ..................... | G06Q 40/08 705/31 |
| 2014/0032373 | A1 | 1/2014 | Tierney | |
| 2017/0126823 | A1* | 5/2017 | Gagliardi ............ | G06F 11/3072 |
| 2019/0087529 | A1* | 3/2019 | Steingrimsson ......... | G06N 3/08 |
| 2019/0180385 | A1 | 6/2019 | Stoddard et al. | |

FOREIGN PATENT DOCUMENTS

| | | |
|---|---|---|
| CN | 112348664 A | 2/2021 |
| CN | 113886780 A | 1/2022 |
| CN | 114549009 A | 5/2022 |
| CN | 115018616 A | 9/2022 |
| CN | 115796457 A | 3/2023 |
| IN | 202021012717 A | 1/2021 |
| WO | WO2003102856 A1 * | 12/2003 |
| WO | WO2006110392 A2 * | 10/2006 |
| WO | 2021072943 A1 | 4/2021 |

OTHER PUBLICATIONS

Pegasystems Inc., "Ingesting data from Kafka topics into the Decision Data Store," Retrieved from: https://wiki.pega.com/index.php?title=Ingesting_data_from_Kafka_topics_into_the_Decision_Data_Store&oldid=1224 3, Believed to be published at least as early as Aug. 24, 2021, 11 pages.

Mahapatra, "Event-Driven Payment Processing and Management For Credit Cards Using TIBCO Integration Platform," Available online at: https://akash-mhptr.medium.com/event-driven-payment-processing-and-management-for-credit-cards-using-tibco-integration-platform-e1d410f57f, May 25, 2021, 8 pages.

* cited by examiner

Furnishing Application

File Transmission: SoR 10/12/2023

Suppressed Records 8000

| | | | |
|---|---|---|---|
| Rule-ID | Error A | Account 2000 | Suppress |
| Rule-ID | | Account 2040 | Suppress |
| Rule-ID | Error B | Account 3100 | Suppress |
| Rule-ID | Error B | Account 3300 | Suppress |
| Rule-ID | | Account 3320 | Suppress |
| Rule-ID | Error C | Account 5540 | Suppress |
| Rule-ID | Error A | Account 5780 | Suppress |
| Rule-ID | | Account 6800 | Suppress |
| Rule-ID | | Account 9000 | Suppress |

304B — 306B — 308B — 310B

312B

USER INTERFACE FOR IDENTIFYING AND CORRECTING RESULTS OF DATA PROCESSING RULES PREVENTING TRANSMISSION OF DATA

CROSS-REFERENCES TO RELATED APPLICATIONS

The present application is a continuation in part of co-pending U.S. patent application Ser. No. 18/330,485 titled "PREVENTING TRANSMISSION OF INVALID OR NON-COMPLIANT TRANSACTION DATA TO OTHER ENTITIES" filed Jun. 7, 2023, the entirety of which is hereby incorporated herein by reference.

FIELD OF INVENTION

The present disclosure generally relates to systems and methods for providing a user interface for identifying and correcting results of data processing rules preventing transmission of data, and more particularly for a user interface providing the large-scale selection and correction of furnishing decisions to transmit data to another entity.

BACKGROUND

Governmental and internal regulations, especially regulations directed to financial institutions or publicly traded companies, often require entities disclose a variety of information to other entities and agencies. One such example includes financial institutions disclosing transaction data to credit bureaus to identify an individual's credit score. There are risks associated with transmitting transaction data though, such as security, privacy, and other regulatory risks. To mitigate the risk, entities generally develop internal procedures for determining whether transaction data should be transmitted to other entities and how the transaction data should be transmitted to comply with various regulations and safety standards. Current techniques of entities for identifying whether transaction data should be transmitted includes manually reviewing and approving each transaction, however this technique is difficult when there is a high volume of transaction data (e.g., more than a thousand). Further, current techniques rely on implementing different platforms to streamline data-collection and formatting functions, such as generating a system-of-record (SOR) file that include transaction data corresponding to different user accounts associated with the entity and generating a report of the transaction data that is eventually furnished to the other entity.

SUMMARY

According to certain embodiments, a method for providing a user interface for identifying and correcting results of data processing rules includes: applying a set of data processing rules to a set of transaction data to determine a furnishing decision for a subset of the set of transaction data, wherein the furnishing decision comprises determining whether first data of the subset and second data of the subset is suppressed or transmitted to an entity; receiving a selection of one or more data processing rules of the set of data processing rules; determining, based on the selected data processing rules, a list of accounts comprising at least a first account and a second account, wherein the first account is associated with the first data of the subset and the furnishing decision for the first data, and the second account is associated with the second data of the subset and the furnishing decision for the second data; changing the furnishing decision for the first data; and automatically updating the furnishing decision for data associated with each account of the list of accounts.

In a further embodiment, a method for providing a user interface for identifying and correcting results of data processing rules further includes generating a textual report comprising a list of data of the subset to be furnished and one or more accounts associated with the subset; and transmitting data of the subset of data with a furnishing decision of transmit.

In a further embodiment, the user interface further includes a first area associated with data to be transmitted; a second area associated with data to be suppressed; and a third area associated with data comprising changed furnishing decisions; and wherein the data of the first area, second area, and third area are selectable by a user for editing of furnishing decisions. In another embodiment, the subset comprises system of record (SOR) files.

In a further embodiment, the set of data processing rules include one or more of a rule identifier identifying a data processing rule and an error identifier identifying an error in the set of transaction data.

In a further embodiment, a method for providing a user interface further includes assigning a priority level to the subset; and displaying the first account and the second account from the list in order based on the priority level of the data of the set of transaction data.

In another embodiment, a method for providing a user interface further includes generating a task queue of the subset to be reviewed based on the priority level; and outputting to a user interface a notification to notify a user of the task queue.

The above methods can be implemented as computer-executable program instructions stored in a non-transitory, tangible computer-readable media and/or operating within a processor or other processing device and memory.

BRIEF DESCRIPTION

Features, embodiments, and advantages of the present disclosure are better understood when the following Detailed Description is read with reference to the accompanying drawings.

DETAILED DESCRIPTION

Figure 1:
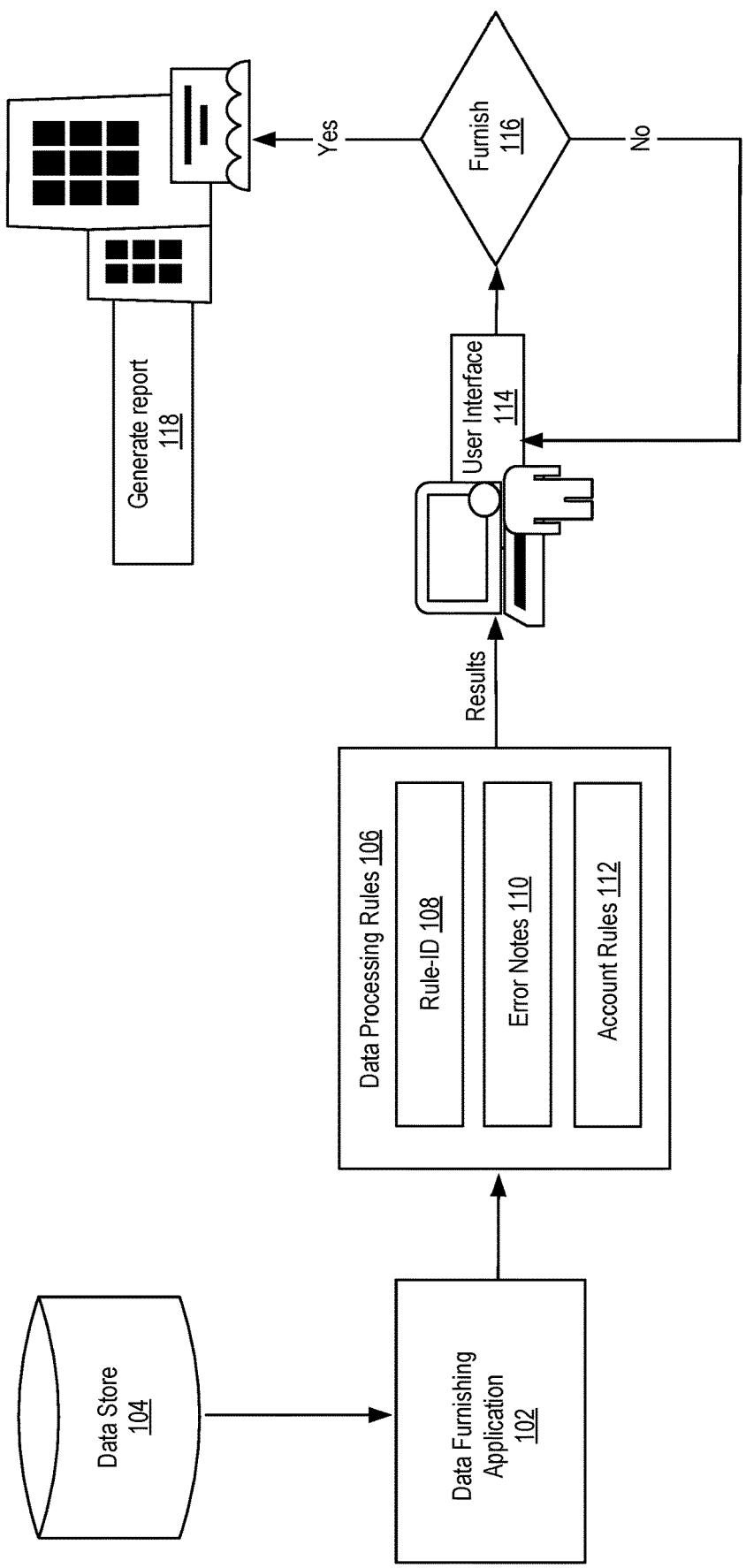
FIG. 1 illustrates an example schematic diagram for controlling transmission of data to other entities, in accordance with some embodiments.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Example of a User Interface Microservice

Techniques disclosed herein provide solutions for a user interface to automatically identify non-compliant data such as transaction data of SOR files, and correcting determinations of whether to furnish or suppress transaction data to another entity.

In one illustrative example, a system for a user interface microservice includes a data furnishing application and data store. The data furnishing application may be executed locally on a user device or may be executed remotely via a cloud services provider. The data furnishing application receives transaction data from the data store. For example, the data store may be a repository or database of transaction data. Some non-limiting examples of transaction data may include user requests for a credit check, requests for a mortgage or other loans, and sales or purchases of the user.

The data furnishing application applies data processing rules to the transaction data to determine whether the transaction data is compliant with government and business regulations. When the transaction data is compliant with the regulations, the data furnishing application identifies the transaction as ready to be transmitted to another entity as demonstrated by outputting a "Furnish" furnishing decision. In some examples, the data furnishing application may automatically transmit the transaction data to another entity when the data furnishing application outputs a "Furnish" furnishing decision for the transaction data. When the transaction data is not compliant with the regulations, the data furnishing application recommends that the transaction not be transmitted to another entity as demonstrated by outputting a "Suppress" furnishing decision.

Users may review the "Furnish" and "Suppress" furnishing decision through a user interface in real time or near real time. The user interface may be the user interface of the data furnishing application or may be the user interface of a separate application. For example, the furnishing application may transmit the transaction data, "Furnish" furnishing decisions, and "Suppress" decisions to an additional application for review and remediation. In some examples, the user interface is part of a separate Furnish Decision Dashboard and may query "Furnish" decisions and "Suppress" furnishing decisions associated with transaction data from the data furnishing application. In further examples, the user interface may be a microservice. Users provide inputs to the user interface to amend "Furnish" and "Suppress" furnishing decisions. In some examples, the user interface may be configured to allow users cause the system to sort between transaction data associated with a "Furnish" furnishing decision and transaction data associated with a "Suppress" furnishing decision. The system may select results with a "Suppress" result and further filter the results based on individual data processing rules that caused the "Suppress" result. For example, the system may select a data processing rule that causes a plurality of "Suppress" results for the transaction data and change the plurality of "Suppress" results, or a subset of the plurality of "Suppress" results to "Furnish" and transmit the transaction data to another entity. In some examples, the furnishing application or other application may generate a report of the "Furnish" furnishing decision and send the report to the other entity. In further examples, the report is viewable by the user and the system may choose whether to send the report.

The report may include transaction data with "Furnish" results formatted based on requirements of the entity to receive the report. For example, the report may follow Metro2 formatting requirements for headings, positioning of elements, length, and field values. In some examples, the application associated with the user interface or user interface microservice may generate the report. In other examples, the data furnishing application may communicate with the user interface microservice or application to receive user inputs to update "Furnish" results and "Suppress" results and generate the report incorporating user inputs.

Example of a User Interface Microservice

FIG. 1 illustrates an example schematic diagram 100 for providing a user interface for controlling transmission of invalid or non-compliant transaction data to other entities, in accordance with some embodiments. In FIG. 1, a data furnishing application 102 accesses transaction data of a system-of-record (SOR) file associated with an entity. In some instances, the data furnishing application 102 accesses the SOR file from a data store 104 (e.g., a central data repository, a SOR database). The transaction data is associated with an account of a user and can correspond to a particular portion (e.g., a row) of the SOR file. The SOR file may be generated in a file format (e.g., a Metro2 file format) specified by the data-collection agencies. The transaction data can correspond to credit and debit transactions the user has performed over a given time period (e.g., February). The transaction data can include information that may be invalid or non-compliant with one or more rules of the entity, governmental regulations, and rules of the data-collection agency. In some instances, the transaction data can be preprocessed by a data-quality scanner to identify and remove any invalid data that may trigger errors. Additionally, or alternatively, the data furnishing application can assign a priority level (e.g., a severity level) to the transaction data, at which the review of the transaction data can be expedited (e.g., place in front of a queue) or delayed in accordance with the assigned priority level. A user interface 114 may display the accounts associated with the transaction data based on the priority level such as by displaying higher priority level accounts and transaction data at the beginning of a list. The data furnishing application 102 or user interface 114 may output a notification to the user interface to notify users of transaction data and accounts associated with the transaction data based on the priority level.

The data furnishing application 102 applies a plurality of data processing rules 106 to the transaction data to determine whether the transaction data is to be suppressed or furnished to another entity (e.g., a data-collection agency). In some instances, each data processing rule of the plurality of data processing rules is associated with a rule condition and a particular rule category of a set of rule categories, which is represented by a rule identifier (e.g., Rule-ID 108). The Rule-ID 108 are rules that generally apply to all accounts associated with the entity. The data processing rules may further include Error Notes 110, which are rules specific to discrepancies identified from the transaction data of the user and may be represented by an error identifier such as a name associated with the error (e.g., Error Note A, Error Note B, Address_Error). In further examples, the data processing rules may also include Account Rules 112, which may be rules specific to an account. The Account Rules 112 may take precedence over rules from the Rule-ID 108 and Error Notes 110. For example, an account owner may place a hold on his or her account, which may cause transaction data associated with the account to not be transmitted (e.g., "Suppress" furnishing decision) when the Rule-ID and Error Notes 110 would otherwise cause the transaction data to be transmitted (e.g., a "Furnish" furnishing decision). This may allow an entity to make account level decisions where appropriate, such as by an account holder's request, or in response to suspicious activity such as suspected fraud.

Figure 3A:
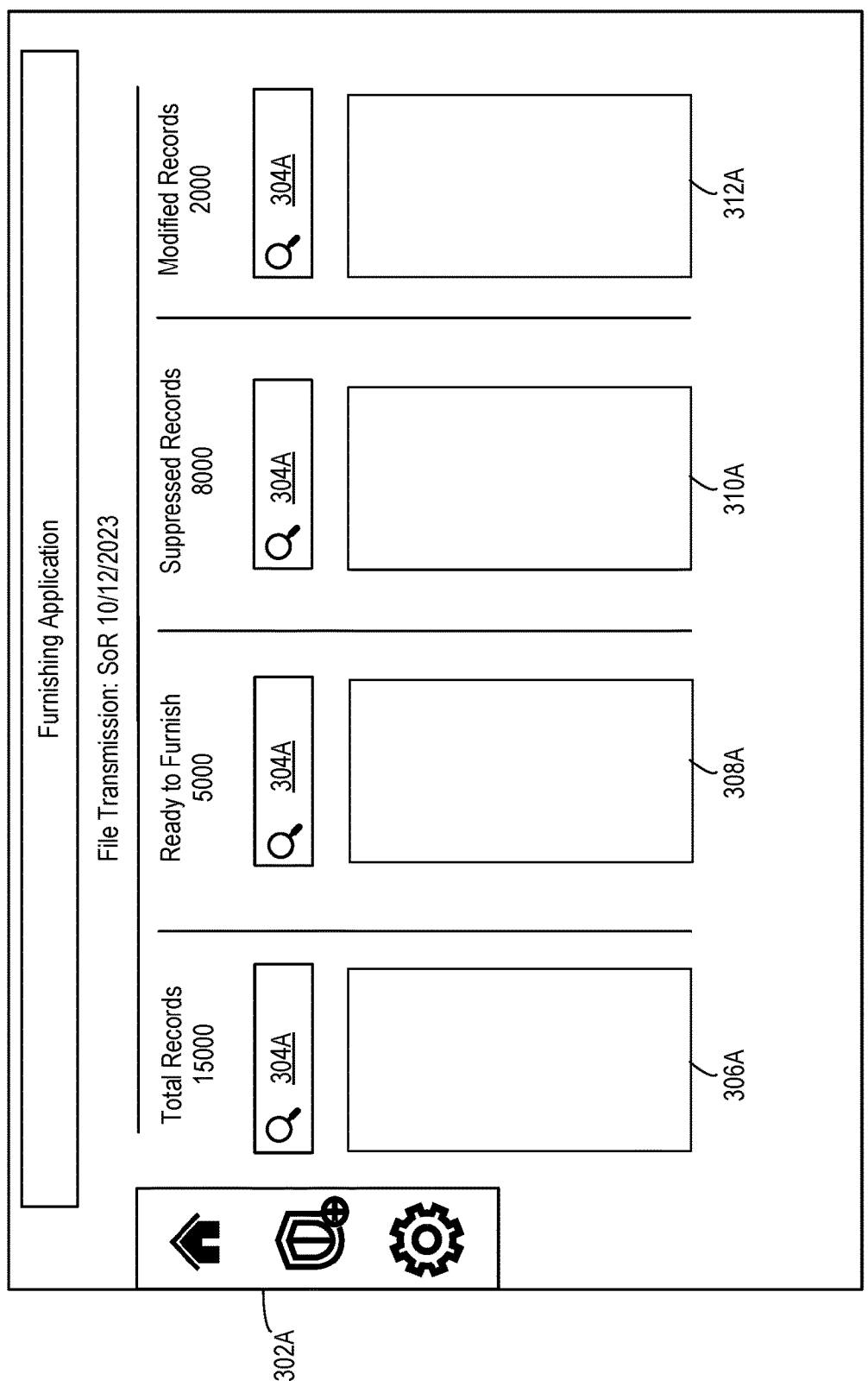
FIGS. 3A-3C illustrate a user interface for identifying, reviewing, and correcting results of data processing rules, in accordance with some embodiments.
Figure 3B:
Figure 3B:
Figure 3B:

The results from applying the data processing rules 106 to the transaction data may be displayed to the user via user interface 114. FIGS. 3A-3B further describe an example user interface 114. The user interface 114 is populated with the results, which includes the Rule-ID 108, Error Notes 110, Account Rules 112, and furnishing decisions. In some embodiments, the user interface 114 is configured to allow the user to adjust furnishing decisions at the Rule-ID 108, Error Notes 110, and Account Rules 112, which allows for furnishing decisions to be applied across high volumes of transaction data (e.g., a thousand or more) or on an individual account basis. For example, the system may adjust application of the Rule-ID 108, Error Notes 110, and Account Rules 112 such that a plurality of suppressing decisions for a particular Rule-ID 108 is furnished instead of suppressed.

At decision block 116, the data furnishing application 102 determines whether to furnish or suppress the transaction data based on outputs generated by applying the data processing rules 106. For example, the data furnishing application 102 generates a textual report (block 118), in response to determining that the transaction data satisfies all conditions associated with the data processing rules. In some instances, the data furnishing application 102 generates and furnishes the textual report to the data-collection agency, when the output from applying the data processing rules 106 indicates a "Furnish" furnishing decision (regardless of outputs from rules of other rule categories).

The textual report may be a document that includes a list that includes a combination of one or more of the transaction data, accounts, furnishing decisions, and data processing rules for transaction data to be transmitted. In some embodiments, the textual report may include a combination of one or more of the transaction data, accounts, furnishing decisions, and data processing rules for transaction data to be suppressed. Users may review the textual report, and edit the furnishing decisions at the user interface, and generate an updated textual report.

When the data furnishing application 102 determines that the transaction data should be suppressed, the data furnishing application 102 transmits the transaction data for remedial action to the user interface 114. In some examples, remediation occurs at the data furnishing application 102. The remedial action can include modifying or removing information that triggers the violation of one or more conditions of the data processing rules 106. In some instances, once the user modifies transaction data, the data furnishing application 102 applies the data processing rules 106 again to determine whether to furnish the modified transaction data to the data-collection agency. In some instances, the data furnishing application 102 generates and furnishes a report that excludes transaction data, while the transaction data is being suppressed and remediated. Further examples may update the report automatically or periodically, such as according to a preset schedule.

Illustrative Method of Providing a User Interface Microservice

Figure 2:
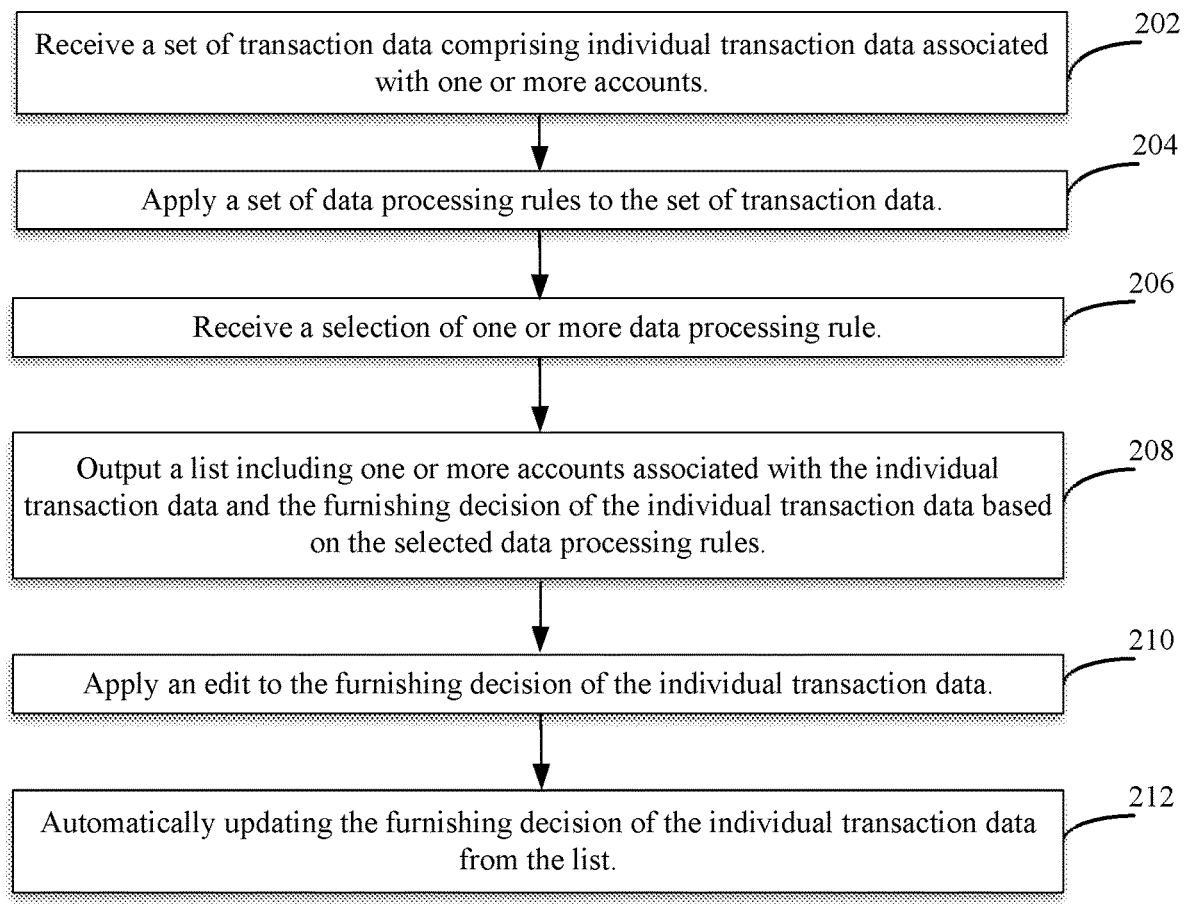
FIG. 2 illustrates a process for operating a user interface for identifying and correcting results of data processing rules, in accordance with some embodiments.

FIG. 2 is a flowchart showing an illustrative method 200 of operating a metadata driven microservice for filing complaints. In some examples, some of the steps in the flow chart of FIG. 2 are implemented in program code executed by a processor, for example, the processor in a general-purpose computer, mobile device, or server. In some examples, these steps are implemented by a group of processors. In some examples the steps shown in FIG. 2 are performed in a different order or one or more steps may be skipped. Alternatively, in some examples, additional steps not shown in FIG. 2 may be performed.

At step 202, a data furnishing application, such as the data furnishing application 102 from FIG. 1, receives a set of transaction data including individual transaction data associated with one or more accounts. The set of transaction data includes a plurality of data of transactions, with individual transactions and their associated data, referred to for purposes of the application as individual transaction data or transaction data. Individual transaction data may be associated with multiple accounts. For example, individual transaction data for financing a purchase may be associated with the accounts of a purchaser and a seller. Accounts may also be associated with multiple individual transaction data. For example, a user may make two separate requests for a credit report from two credit bureaus, and the separate requests may be represented by two separate units of individual transaction data associated with the same account.

At step 204, a data furnishing application, such as the data furnishing application 102 from FIG. 1, applies a set of data processing rules to the set of transaction data. The individual transaction data from the set of transaction data may include personal information of a user, which, if disclosed, may compromise the user's data security and privacy. For example, transaction data may include the user's address, phone number, social security number, credit card number, employee ID information, or bank account number and routing numbers.

One example of data processing rules may include a rule identifying whether the transaction data includes appropriate personal information of a user for an associated transaction. For example, individual transaction data associated with a request for a credit report may require a requester's address and social security number. The individual transaction data may be compliant with the example data processing rule when the individual transaction data includes the requester's address and social security number. In another example, the individual transaction data may be noncompliant with the data processing rule when the individual transaction data does not include the requester's address and social security number or includes unnecessary information such as the requester's email address or other personal information not needed for the transaction.

The data furnishing application determines a furnishing decision of whether to transmit individual transaction data from the set of transaction data based on the set of data processing rules. The furnishing decision may include a determination of whether to transmit the individual transaction data (e.g., "Furnish") to another entity or to not transmit the individual transaction data (e.g., "Suppress"). The data furnishing application determines the furnishing decision from applying the data processing rules and determines a furnishing decision for each of the individual transaction data from the set of transaction data. In some embodiments, when there is an error in applying the data processing rules to the individual transaction data, the furnishing decision may default to a determination to suppress the individual transaction data.

In some examples, the data furnishing application determines whether to suppress or furnish the transaction data by accessing a decision matrix representing the data processing rules and compares the rules of the decision matrix to the individual transaction data.

At step 206, the data furnishing application receives a selection of one or more data processing rules. In some embodiments, data furnishing application may receive the selection from a user through a user interface, further described in the description of FIGS. 3A-3C. The user interface may include various data elements, buttons, and input fields such as drop-down menus and search bars by which users may provide input to cause the system to select individual data processing rules or combinations of data processing rules. The system may also select accounts, individual transaction data, and furnishing decisions.

At step 208, the data furnishing application outputs a list including one or more accounts associated with the individual transaction data and the furnishing decision of the individual transaction data based on the selected data processing rules. The data furnishing application may output the list through a user interface, further described in FIGS. 3A-3C. The user interface may convey a list of accounts with furnishing decisions for display on a display of a computing device.

In one embodiment the system selects an individual account or plurality of accounts. The system may select a furnishing decision, such as selecting all furnishing decisions to suppress. In such an embodiment, the user interface may display a list of accounts with Rule-IDs, and Error Notes associated with the suppress furnishing decision. Further description of Rule-IDs and Error Notes is provided in the description of FIG. 1. In other embodiments, the system may further filter the list of accounts based on the Rule-ID or Error Notes. In still other embodiments the system may modify settings to select a particular Rule-ID, Error Note, or combinations of Rule-IDs and Error Notes at input fields of the user interface.

In one example, the system may select a set of accounts associated with suppress furnishing decisions and select one or more Rule-IDs associated with a subset of the accounts with suppress furnishing decisions. The system may also select an Error Note, so the application identifies and displays a subset of accounts with the selected combination of the suppress furnishing decision, Rule-ID, and Error Note. In other example embodiments, the system may select multiple Rule-IDs and Error Notes.

At step 210, the data furnishing application applies an edit to the furnishing decision of the individual transaction data associated with the account from the list. In some examples, the system may edit the furnishing decision of an individual account or for a plurality of accounts.

At block 212, the data furnishing application automatically updates the furnishing decisions of the individual transaction data associated with the accounts from the list. For example, the data furnishing application may apply an edit to a furnishing decision of multiple accounts or multiple individual transaction data, such as a high volume of accounts or individual transaction data (e.g., over a thousand), concurrently or sequentially in real time or near real time.

Example User Interface

Figure 3C:

FIG. 3A, FIG. 3B, and FIG. 3C illustrate example user interfaces for identifying, reviewing, and correcting results of data processing rules.

FIG. 3A illustrates an example user interface 300A. The user interface 300A conveys for display summaries and furnishing decisions of accounts associated with individual transaction data to be transmitted to another entity. In one example, the user interface is provided by a separate dashboard application or microservice. For example, furnishing decisions may be queried by the dashboard application from a decision matrix microservice or the furnishing application applying data processing rules.

FIG. 3A demonstrates a state of the user interface conveying four separate areas for display of accounts, Rule-IDs, and Error Notes. The user interface 300A may change states based on inputs of the user, such as three potential states shown in FIG. 3A, FIG. 3B, and FIG. 3C. By way of example and not to limit the user interface to a particular configuration or embodiment, user interface 300A includes four separate areas or sections. These sections include a Total Records section 306A, a Ready to Furnish section 308A, a Suppressed Records section 310A, and a Modified Records section 312A. In the embodiment shown in FIG. 3A, the four sections have a high volume of transaction data, including data associated with thousands of transactions and accounts per section. The user interface may further include a menu 302A and one or more input sections such as input fields 304A configured to allow users to search for accounts, Rule-IDs, or Error Notes for a section.

The Total Records section 306A is a section of the user interface associated with all of the available transaction data available. Users may select the Total Records section 306A to view and edit all of the available transaction data, as well as all individual accounts, Rule-IDs, Error Notes, and furnishing decisions.

The Ready to Furnish section 308A is a section of the user interface 300A associated with the individual transaction data that the data furnishing application has determined to transmit to another entity (e.g., "Furnish" furnishing decision). The system may edit the furnishing decisions of individual transaction data on an account basis and may edit furnishing decisions for a set of accounts associated with selected Rule-IDs and Error Notes. For example, the system may modify settings to switch the furnishing decisions from a "Furnish" furnishing decision to a "Suppress" furnishing decision for transaction data associated with a selected Rule-ID or Error Note.

In some embodiments, the data furnishing application transmits the transaction data conveyed in the Ready to Furnish section 308A to another entity. In further embodiments, the data furnishing application generates a report to transmit based on the transaction data conveyed in section 308A. In other embodiments, the data furnishing application transmits the transaction data or report after a user inputs a command to transmit the transaction data (e.g., because the user has reviewed the transaction data). In further embodiments, the data furnishing application holds the transaction data for a predetermined period of time and transmits the transaction data to another entity when the user does not provide input stopping the transmission of the transaction data.

The Suppressed Records section 310A is a section of the user interface associated with the transaction data available for display, which the data furnishing application determines not to transmit to another entity (e.g., "Suppress" decision). Users may edit the furnishing decisions of transaction data account by account or edit a plurality of accounts associated with a selected Rule-ID or Error Note.

The Modified Records section 312A is a section of the user interface associated with the individual transaction data available for display, which the data furnishing application determines not to transmit to another entity. In some embodiments, when the system edits a furnishing decision from the Ready to Furnish section 308A or the Suppressed Records section 310A, the user interface may include the individual transaction data associated with the edited furnishing decision at the Modified Records section 312A instead of or in addition to including the transaction data at the Ready to Furnish section 308A or the Suppressed Records section 310A. Users may further edit the furnishing decision from the Modified Records section 312A.

In some examples, the Modified Records section 312A includes a subset of transaction data from the Ready to Furnish section 308A and the Suppressed Records section 310A. In such an example, the user interface 300A may display user edited furnishing decisions and individual transaction data under both the Ready to Furnish section 308A and Modified Records section 312A.

Menu 302A includes a section for adjusting settings of the data furnishing application, such as security options (e.g., login and access credentials), and arrangements of elements of the user interface 300A such as positioning of sections and graphics.

FIG. 3B illustrates an example user interface 300B for the Suppressed Records section 310A from FIG. 3A. FIG. 3B shows the selection of a particular Rule-ID 304B that caused a suppress furnishing decision 310B. This is shown by user selection in input buttons 312B. For example, the system may select or input a Rule-ID 304B into an input field such as input field 304A in FIG. 3A to transition the user interface 300A to user interface 300B. User interface 300B may convey for display a list of accounts 308B associated with the suppress furnishing decision 310B and the Rule-ID 304B inputted by the user at input field 304A.

In some examples, the user interface 300B may also convey for display Error Notes 306B associated with the list of accounts 308B. The system may select accounts from the list of accounts 308B to edit the suppress furnishing decision 310B. The user interface 300A may convey for display selected accounts from the list of accounts 308B in the Modified Records section 312A.

FIG. 3C illustrates an example user interface 300C for the Modified Records section 312A from FIG. 3A. For example, FIG. 3C shows the selected accounts from the list of accounts 308B of FIG. 3B. FIG. 3C shows the Rule-ID 304C, Error Notes 306C, and updated furnish furnishing decision 310C for the list of accounts 308C.

Example Computing Environment

Figure 4:
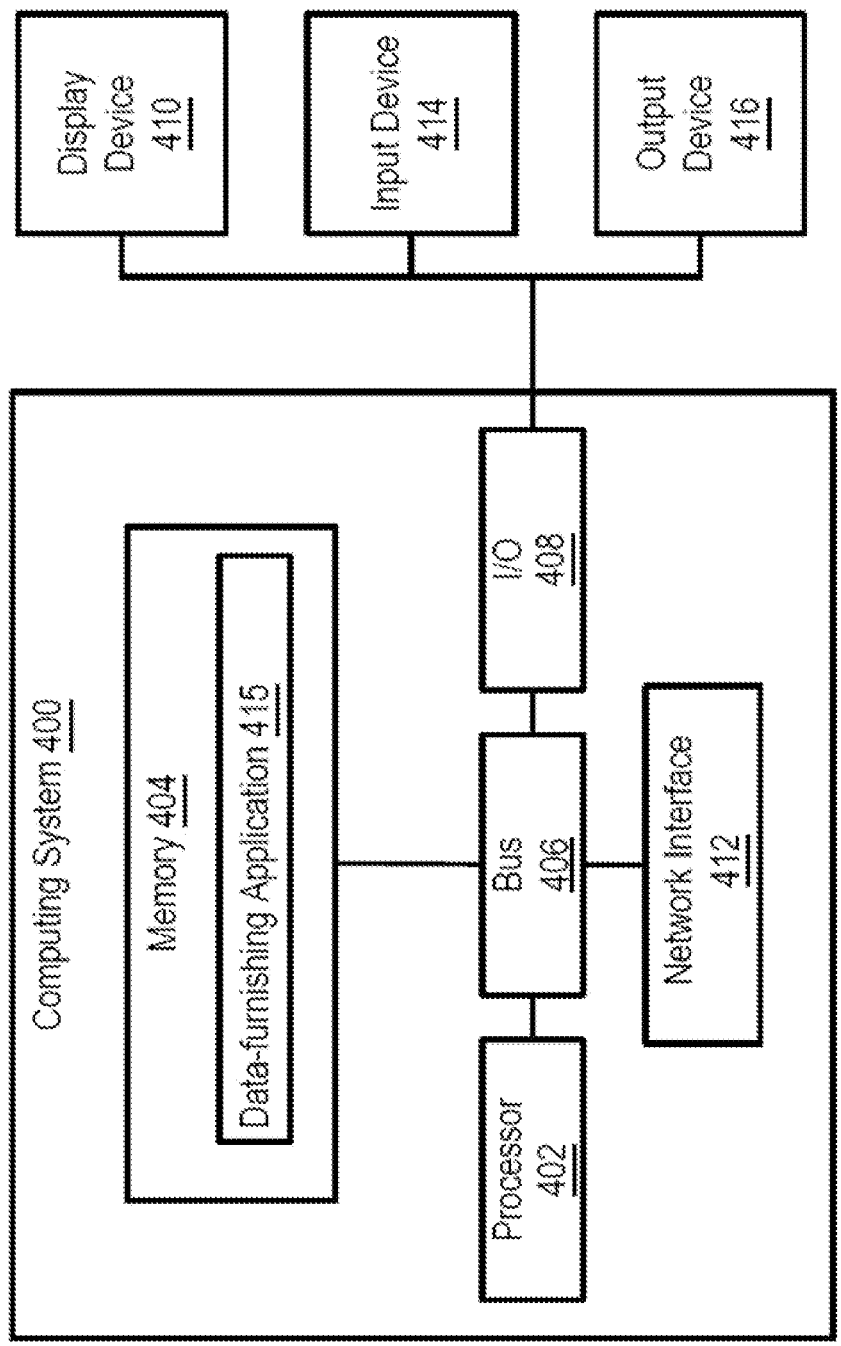
FIG. 4 depicts a computing system configured for identifying and correcting results from data processing rules, in accordance with some embodiments.

Any suitable computing system or group of computing systems can be used for performing the operations described herein. For example, FIG. 4 depicts a computing system 400 that can implement any of the computing systems or environments discussed above. In some embodiments, the computing system 400 includes a processing device 402 that executes the data furnishing application 102, a memory that stores various data computed or used by the data furnishing application 102, an input device 414 (e.g., a mouse, a stylus, a touchpad, a touchscreen), and an output device 416 that presents output to a user through a user interface, further described in the description of FIG. 3. For illustrative purposes, FIG. 4 depicts a single computing system on which the data furnishing application 102 is executed, and the input device 414 and output device 416 are present. But these applications, datasets, and devices can be stored or included across different computing systems having devices similar to the devices depicted in FIG. 4.

The example of FIG. 4 includes a processing device 402 communicatively coupled to one or more memory devices 404. The processing device 402 executes computer-executable program code stored in a memory device 404, accesses information stored in the memory device 404, or both. Examples of the processing device 402 include a microprocessor, an application-specific integrated circuit ("ASIC"), a field-programmable gate array ("FPGA"), or any other suitable processing device. The processing device 402 can include any number of processing devices, including a single processing device.

The memory device 404 includes any suitable non-transitory, computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, read-only memory (a ROM), a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 400 may also include a number of external or internal devices, such as a display device 410, or other input or output devices. For example, the computing system 400 is shown with one or more input/output ("I/O") interfaces 408. An I/O interface 408 can receive input from input devices or provide output to output devices. One or more bus 406 are also included in the computing system 400. Each bus 406 communicatively couples one or more components of the computing system 400 to each other or to an external component.

The computing system 400 executes program code that configures the processing device 402 to perform one or more of the operations described herein. The program code includes, for example, code implementing the data furnishing application 102 or other suitable applications that perform one or more operations described herein. The program code may be resident in the memory device 404 or any suitable computer-readable medium and may be executed by the processing device 402 or any other suitable processor. In some embodiments, all modules in the data furnishing application 102 are stored in the memory device 404, as depicted in FIG. 4. In additional or alternative embodiments, one or more of these modules from the data furnishing application 102 are stored in different memory devices of different computing systems.

In some embodiments, the computing system 400 also includes a network interface device 412. The network interface device 412 includes any device or group of devices suitable for establishing a wired or wireless data connection to one or more data networks. Non-limiting examples of the network interface device 412 include an Ethernet network adapter, a modem, and/or the like. The computing system 400 is able to communicate with one or more other computing devices (e.g., a computing device that receives inputs for data furnishing application 102 or displays outputs of the data furnishing application 102) via a data network using the network interface device 412.

An input device 414 can include any device or group of devices suitable for receiving visual, auditory, or other suitable input that controls or affects the operations of the processing device 402. Non-limiting examples of the input device 414 include a touchscreen, stylus, a mouse, a keyboard, a microphone, a separate mobile computing device, etc. An output device 416 can include any device or group of devices suitable for providing visual, auditory, or other suitable sensory output. Non-limiting examples of the output device 416 include a touchscreen, a monitor, a separate mobile computing device, etc. The output device 416 may display the user interface described further in the description of FIGS. 3A and 3B and the input device 414 may provide inputs to the user interface.

Although FIG. 4 depicts the input device 414 and the output device 416 as being local to the computing device that executes the data furnishing application 102, other implementations are possible. For instance, in some embodiments, one or more of the input device 414 and the output device 416 include a remote client-computing device that communicates with the computing system 400 via the network interface device 412 using one or more data networks described herein.

Example Advantages

In some examples, the user interface allows users to reduce the amount of user interaction required to verify that information complies with industry rules, thereby greatly increasing the efficiency of the system preventing transmission of data. Further, the user interface allows for high volume adjustment of results, such as by allowing for thousands or more transactions to be corrected and compared for compliance. As one example, an organization may collect customer data associated with a request for a mortgage. Collected data includes information like name, address, and specific information regarding customer requests. Each of these various pieces of information must be checked for compliance with rules, e.g., a rule may be that the last name must comprise two or more letters or include performing checks such as ensuring that the listed address exists. Under current systems, if any of the data is faulty, it is output to a spreadsheet that users must manually reconcile to confirm whether the data is accurate. Certain embodiments described herein solve this problem by using data processing rules to automatically compare data.

In some examples, the user interface is directed to automatically identifying and correcting invalid or non-compliant transaction data that should be remediated before furnishing it to the other entities. For example, the user interface may identify the non-compliant transaction data, organize the non-compliant transaction data based on a severity ranking (e.g., predetermined importance of the transaction data, length of time the transaction data has been non-compliant, and type of transaction data). The use of data processing rules can also facilitate reduction of false positives and false negatives in which some transaction data may be erroneously identified as being suppressed or furnished. For example, users may provide input to the user interface to override or supersede data processing rules for a particular account, or a plurality of accounts under a particular or combination of data processing rules associated with the decision furnish or suppress the transaction data. As a result, certain embodiments can reduce the risk of the entity transmitting invalid or non-compliant transaction data to other entities, and withholding compliant transaction data that should be transmitted to other entities, improving the accuracy and efficiency of providing transaction data to other entities.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

Although the disclosure has been shown and described with respect to one or more implementations, equivalent alterations and modifications will occur based on a reading and understanding of this specification and the drawings. The disclosure includes all such modifications and alterations and is limited only by the scope of the following claims.

What is claimed is:

1. A method comprising:
    applying a set of hierarchical data processing rules to a set of transaction data to determine a furnishing decision for a subset of the set of transaction data, wherein the furnishing decision comprises determining whether first data of the subset and second data of the subset is suppressed or transmitted from a first entity to another entity separate from the first entity, wherein the set of transaction data is organized in one or more system of record (SOR) files, wherein each transaction data in the one or more SOR files comprise a plurality of account information associated with a plurality of users, and wherein the set of hierarchical data processing rules have narrowing scope such that at least one data processing rule is applied against every account information and at least a second data processing rule is applied against a subset of account information;
    receiving a selection of one or more data processing rules of the set of hierarchical data processing rules;
    assigning a priority level to each transaction data in the set of transaction data based on a severity level, wherein the first data has a first priority level indicating a higher severity than a second priority level of the second data, wherein processing transaction data with a highest priority level is expedited by placing the transaction data with the highest priority level in a front position of a queue;
    determining, based on the selected data processing rules and in an order associated with the assigned priority level, a list of accounts comprising at least a first account and a second account, wherein the first account is associated with the first data of the subset and the furnishing decision for the first data, and the second account is associated with the second data of the subset and the furnishing decision for the second data;
    changing the furnishing decision for the first data to a furnishing decision of suppress; and
    automatically updating the furnishing decision for data associated with each remaining account of the list of accounts in the order associated with the assigned priority level.

2. The method of claim 1, further comprising:
    generating a textual report comprising a list of data of the subset to be furnished and one or more accounts associated with the subset; and
    transmitting data of the subset of data with a furnishing decision of transmit.

3. The method of claim 1, wherein the method further comprises:
    providing a user interface comprising:
        a first area associated with data to be transmitted;
        a second area associated with data to be suppressed; and
        a third area associated with data comprising changed furnishing decisions; and
    wherein the data of the first area, second area, and third area are selectable by a user for editing of furnishing decisions.

4. The method of claim 1, wherein the at least one data processing rule that is applied against every account information includes a rule identifier specifying a rule condition and a rule category, and wherein the second data processing rule includes an error identifier identifying an error in the set of transaction data.

5. The method of claim 1, further comprising delaying a processing of subsequent transaction data in order based on the priority level of the data of the set of transaction data.

6. The method of claim 5, further comprising:
    generating a task queue of the subset to be reviewed based on the priority level; and
    outputting to a user interface a notification to notify a user of the task queue.

7. A system comprising one or more processors and at least one memory, the at least one memory storing instructions which, when executed by the one or more processors, cause the system to perform one or more operations comprising:
    applying a set of hierarchical data processing rules to a set of transaction data to determine a furnishing decision for a subset of the set of transaction data, wherein the furnishing decision comprises determining whether first data of the subset and second data of the subset is suppressed or transmitted from a first entity to another entity separate from the first entity, wherein the set of transaction data is organized in one or more system of record (SOR) files, wherein each transaction data in the one or more SOR files comprise a plurality of account information associated with a plurality of users, and wherein the set of hierarchical data processing rules have narrowing scope such that at least one data processing rule is applied against every account information and at least a second data processing rule is applied against a subset of account information;
    receiving a selection of one or more data processing rules of the set of hierarchical data processing rules;
    assigning a priority level to each transaction data in the set of transaction data based on a severity level, wherein the first data has a first priority level indicating a higher severity than a second priority level of the second data, wherein processing transaction data with a highest priority level is expedited by placing the transaction data with the highest priority level in a front position of a queue;
    determining, based on the selected data processing rules and in an order associated with the assigned priority level, a list of accounts comprising at least a first account and a second account, wherein the first account is associated with the first data of the subset and the furnishing decision for the first data, and the second account is associated with the second data of the subset and the furnishing decision for the second data;
    changing the furnishing decision for the first data to a furnishing decision of suppress; and
    automatically updating the furnishing decision for data associated with each remaining account of the list of accounts in the order associated with the assigned priority level.

8. The system of claim 7, further comprising:
    generating a textual report comprising a list of data of the subset to be furnished and one or more accounts associated with the subset; and transmitting data of the subset of data with a furnishing decision of transmit.

9. The system of claim 7, wherein the operations executed by the one or more processors further comprise:
providing a user interface comprising:
a first area associated with data to be transmitted;
a second area associated with data to be suppressed; and
a third area associated with data comprising changed furnishing decisions; and
wherein the data of the first area, second area, and third area are selectable by a user for editing of furnishing decisions.

10. The system of claim 7, wherein the at least one data processing rule that is applied against every account information includes a rule identifier specifying a rule condition and a rule category, and wherein the second data processing rule includes an error identifier identifying an error in the set of transaction data.

11. The system of claim 7, further comprising delaying a processing of subsequent transaction data in order based on the priority level of the data of the set of transaction data.

12. The system of claim 11, further comprising:
generating a task queue of the subset to be reviewed based on the priority level; and
outputting to a user interface a notification to notify a user of the task queue.

13. A non-transitory computer-readable medium comprising instructions which, when executed by one or more processors of a computing system, cause the computing system to perform one or more operations comprising:
applying a set of hierarchical data processing rules to a set of transaction data to determine a furnishing decision for a subset of the set of transaction data, wherein the furnishing decision comprises determining whether first data of the subset and second data of the subset is suppressed or transmitted from a first entity to another entity separate from the first entity, wherein the set of transaction data is organized in one or more system of record (SOR) files, wherein each transaction data in the one or more SOR files comprise a plurality of account information associated with a plurality of users, and wherein the set of hierarchical data processing rules have narrowing scope such that at least one data processing rule is applied against every account information and at least a second data processing rule is applied against a subset of account information;
receiving a selection of one or more data processing rules of the set of hierarchical data processing rules;
assigning a priority level to each transaction data in the set of transaction data based on a severity level, wherein the first data has a first priority level indicating a higher severity than a second priority level of the second data, wherein processing transaction data with a highest priority level is expedited by placing the transaction data with the highest priority level in a front position of a queue;
determining, based on the selected data processing rules and in an order associated with the assigned priority level, a list of accounts comprising at least a first account and a second account, wherein the first account is associated with the first data of the subset and the furnishing decision for the first data, and the second account is associated with the second data of the subset and the furnishing decision for the second data;
changing the furnishing decision for the first data to a furnishing decision of suppress; and
automatically updating the furnishing decision for data associated with each remaining account of the list of accounts in the order associated with the assigned priority level.

14. The non-transitory computer-readable medium of claim 13, further comprising:
generating a textual report comprising a list of data of the subset to be furnished and one or more accounts associated with the subset; and
transmitting data of the subset of data with a furnishing decision of transmit.

15. The non-transitory computer-readable medium of claim 13, wherein the instructions further comprise:
providing a user interface comprising:
a first area associated with data to be transmitted;
a second area associated with data to be suppressed; and
a third area associated with data comprising changed furnishing decisions; and
wherein the data of the first area, second area, and third area are selectable by a user for editing of furnishing decisions.

16. The non-transitory computer-readable medium of claim 13, wherein the at least one data processing rule that is applied against every account information includes a rule identifier specifying a rule condition and a rule category, and wherein the second data processing rule includes an error identifier identifying an error in the set of transaction data.

17. The non-transitory computer-readable medium of claim 13, further comprising delaying a processing of subsequent transaction data in order based on the priority level of the data of the set of transaction data.

* * * * *